(12) United States Patent
Pelz et al.

(10) Patent No.: US 11,775,745 B2
(45) Date of Patent: *Oct. 3, 2023

(54) DATABASE MODEL WHICH PROVIDES MANAGEMENT OF CUSTOM FIELDS AND METHODS AND APPARATUS THERFORE

(71) Applicant: Asana, Inc., San Francisco, CA (US)

(72) Inventors: Eric Seth Pelz, San Francisco, CA (US); Gregory Heath Slovacek, San Francisco, CA (US); Rosario John Aquino, San Francisco, CA (US); Jacqueline Frances Bavaro, San Francisco, CA (US); Nicholas William Fassler, Oakland, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,527

(22) Filed: Jan. 25, 2023

(65) Prior Publication Data

US 2023/0161955 A1 May 25, 2023

Related U.S. Application Data

(63) Continuation of application No. 17/184,964, filed on Feb. 25, 2021, which is a continuation of application
(Continued)

(51) Int. Cl.
*G06F 40/177* (2020.01)
*G06F 3/0482* (2013.01)
(Continued)

(52) U.S. Cl.
CPC .......... *G06F 40/177* (2020.01); *G06F 3/0482* (2013.01); *G06F 16/211* (2019.01);
(Continued)

(58) Field of Classification Search
CPC ...... G06F 3/0482; G06F 16/20; G06F 16/211; G06F 16/245; G06F 16/248;
(Continued)

(56) References Cited

U.S. PATENT DOCUMENTS

| 5,233,687 A | 8/1993 | Henderson, Jr. |
| 5,524,077 A | 6/1996 | Faaland |

(Continued)

FOREIGN PATENT DOCUMENTS

| CN | 101305350 A | 11/2008 |
| CN | 101563671 A | 10/2009 |

(Continued)

OTHER PUBLICATIONS

Fang Chen, R. O. Briggs, "Project Progress Tracking Template—Using a Repeatable GSS Process to Facilitate Project Process Management," Proceedings of the 39th Annual Hawaii International Conference on System Sciences (HICSS'06), Kauai, HI, USA, 2006, pp. 17c-17c, doi: 10.1109/HICSS.2006.399. (Year: 2006).

(Continued)

*Primary Examiner* — Wilson W Tsui
(74) *Attorney, Agent, or Firm* — ESPLIN & ASSOCIATES, PC

(57) ABSTRACT

A data model for managing custom fields for tasks in projects. The custom fields can be defined and shared across an organization, and are always unique. Each type of custom field is an object that is subclass of a generic object. Other objects define attributes of the custom fields and assign values to the attributes. The data model allows the custom fields to be preserved and managed across multiple projects and users.

20 Claims, 10 Drawing Sheets

Related U.S. Application Data

No. 15/646,310, filed on Jul. 11, 2017, now Pat. No. 10,977,434.

(51) Int. Cl.
*G06Q 10/0631* (2023.01)
*G06F 16/21* (2019.01)
*G06F 16/25* (2019.01)
*G06F 16/2455* (2019.01)

(52) U.S. Cl.
CPC ........ *G06F 16/212* (2019.01); *G06F 16/2456* (2019.01); *G06F 16/252* (2019.01); *G06Q 10/063118* (2013.01)

(58) Field of Classification Search
CPC .. G06F 40/177; G06F 16/212; G06F 16/2456; G06F 16/252; G06F 16/289; G06Q 10/063118
See application file for complete search history.

(56) References Cited

U.S. PATENT DOCUMENTS

| | | |
|---|---|---|
| 5,530,861 A | 6/1996 | Diamant |
| 5,608,898 A | 3/1997 | Turpin |
| 5,611,076 A | 3/1997 | Durflinger |
| 5,623,404 A | 4/1997 | Collins |
| 5,721,770 A | 2/1998 | Kohler |
| 5,983,277 A | 11/1999 | Heile |
| 6,024,093 A | 2/2000 | Cron |
| 6,256,651 B1 | 7/2001 | Tuli |
| 6,292,830 B1 | 9/2001 | Taylor |
| 6,332,147 B1 | 12/2001 | Moran |
| 6,385,639 B1 | 5/2002 | Togawa |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,349,920 B1 | 3/2008 | Feinberg |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,779,039 B2 | 8/2010 | Weissman |
| 7,801,886 B1 | 9/2010 | Gabriel |
| 7,805,327 B1 | 9/2010 | Schulz |
| RE41,848 E | 10/2010 | Daniell |
| 7,917,855 B1 | 3/2011 | Satish |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,627,199 B1 | 1/2014 | Handley |
| 8,639,552 B1 | 1/2014 | Chen |
| 8,700,537 B1 | 4/2014 | Deshpande |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Rosenstein |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0028616 A1 | 2/2003 | Aoki |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0156138 A1 | 8/2003 | Vronay |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |

(56) References Cited

U.S. PATENT DOCUMENTS

| | | |
|---|---|---|
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0261013 A1 | 12/2004 | Wynn |
| 2004/0268451 A1 | 12/2004 | Robbin |
| 2005/0210394 A1 | 9/2005 | Crandall |
| 2005/0216111 A1 | 9/2005 | Ooshima |
| 2005/0222971 A1 | 10/2005 | Cary |
| 2006/0028917 A1 | 2/2006 | Wigginton |
| 2006/0047454 A1 | 3/2006 | Tamaki |
| 2006/0048151 A1 | 3/2006 | Haruta |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0133524 A1 | 6/2008 | Ryan |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0302521 A1 | 12/2011 | Jiang |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |

(56) References Cited

U.S. PATENT DOCUMENTS

| | | |
|---|---|---|
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Taber |
| 2014/0040780 A1 | 2/2014 | Artzt |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0081685 A1 | 3/2014 | Thacker |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0153906 A1 | 6/2015 | Liao |
| 2015/0178666 A1 | 6/2015 | Green |
| 2015/0213411 A1 | 7/2015 | Swanson |
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0034844 A1 | 2/2016 | Kofman |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0092045 A1 | 3/2016 | Lamas |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Vida |
| 2016/0216854 A1 | 7/2016 | McClellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285471 A1 | 10/2018 | Hao |
| 2018/0316636 A1 | 11/2018 | Kamat |
| 2018/0331842 A1 | 11/2018 | Faulkner |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0265821 A1 | 8/2019 | Pearl |

(56) References Cited

U.S. PATENT DOCUMENTS

| | | |
|---|---|---|
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |
| 2020/0059539 A1 | 2/2020 | Wang |
| 2020/0065736 A1 | 2/2020 | Relangi |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0293975 A1 | 9/2020 | Faulkner |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0182475 A1 | 6/2021 | Pelz |
| 2021/0216562 A1 | 7/2021 | Smith |
| 2021/0232282 A1 | 7/2021 | Karpe |
| 2021/0320891 A1 | 10/2021 | Rosenstein |
| 2021/0342786 A1 | 11/2021 | Jiang |
| 2021/0382734 A1 | 12/2021 | Rosenstein |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |
| WO | 2020006634 A1 | 1/2020 |

OTHER PUBLICATIONS

M. Ramzan, M. A. Iqbal, M. A. Jaffar, A. Rauf, S. Anwar and A. A. Shahid, "Project Scheduling Conflict Identification and Resolution Using Genetic Algorithms," 2010 International Conference on Information Science and Applications, Seoul, Korea (South), 2010, pp. 1-6, doi: 10.1109/ICISA.2010.5480400. (Year: 2010).

Ruoming Pang, Ramon Caceres, Mike Burrows, Zhifeng Chen, Pratik Dave, Nathan Germer, Alexander Golynski, Kevin Graney, Nina Kang, Lea Kissner, Jeffrey L. Korn, Abhishek Parmar, Christina D. Richards, and Mengzhi Wang, "Zanzibar: Google's Consistent, Global Authorization System", 2019 USENIX Annual Technical Conference (USENIX ATC '19), Renton, WA, pp. 1-14 (Year: 2019).

Szabolcs de Gyurky; Mark A. Tarbell, "Project and Task Organization," in The Cognitive Dynamics of Computer Science: Cost-Effective Large Scale Software Development IEEE, 2006, pp. 54-79, doi: 1002/0470036443.ch (Year: 2006).

"U.S. Appl. No. 14/584,750, Examiner Interview Summary dated Feb. 25, 2016", 3 pgs.

"U.S. Appl. No. 14/584,750, Non Final Office Action dated Aug. 28, 2015", 21 pgs.

"U.S. Appl. No. 14/584,750, Notice of Allowance dated Mar. 28, 2016", 8 pgs.

"U.S. Appl. No. 14/584,750, Response filed Feb. 29, 2015 to Non Final Office Action dated Aug. 28, 2015", 16 pgs.

"U.S. Appl. No. 14/584,850, Final Office Action dated Sep. 1, 2017", 31 pgs.

"U.S. Appl. No. 14/584,850, Non Final Office Action dated Jan. 10, 2017", 9 pgs.

"U.S. Appl. No. 14/584,850, Response filed Apr. 10, 2017 to Non Final Office Action dated Jan. 10, 2017", 13 pgs.

"How to Asana: Inviting teammates to Asana." YouTube, Asana, Mar. 21, 2017, https://www.youtube.com/watch?v=TLOruY1KyxU ( Year: 2017), 13 pages.

"Rules of Data Conversion from Document to Relational Databases", published: 2014, publisher: Future-processing, pp. 1-8 (Year: 2014).

(Tiburca, Andrew) Best Team Calendar Applications for 2018-Toggl https://toggl.com/blog/best-team-calendar-applications-for-2018 (Year: 2017) 3 pages.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios,youtube,excerpt, Aug. 1, 2019 https://www.youtube.com/watch?v=7XkNcfFDG6M (Year: 2019) (20 pages).

Asana YouTube channel, list of all product videos, Nov. 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana, Manage your team capacity with Workload, youtube, excerpt, Aug. 1, 2019 https://www.youtube.com/watch?v=2ufXyZDzZnA &list=PLJFG93oi0wJAi UwyOhlGWHdtJzJrzylBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/5860532ae58c6232db243a65/t/5c210c101950b7fc7a8e3274/1545669658049/Asana+Manual.pdf (Year: 2017) (20 pages).

Command and control, Wikipedia, archives org, Mar. 16, 2018 https://web.archive.org/web/20180316193655/https://en.wikipedia.org/wiki/Command_and_control (Year: 2018), 6 pages.

Creating Tables with Fields from 2 Different Tables, published: 2009, publisher: StackOverflow, pp. 1-2. (Year 2009).

Critical chain project management, Wikipedia, archives org, Dec. 17, 2016 https://web.archive.Org/web/201 61217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Dawei Li, "Deepcham: Collaborative Edge-Mediated Adaptive Deep Learning for Mobile Object Recognition", 2016, IEEE/ACM, pp. 64-76 (Year: 2016).

Devon Watts and Nick Fassler, "Now rolling out in beta: Track anything in Asana, with custom fields", publisher: Asana, published: Jul. 12, 2016, pp. 1-7 (Year: 2016).

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

Hartmann, "TimeProjectscheduling with resource capacities and requests varying with time: a case study," 2013, Flexible services and manufacturing journal, vol. 25, No. 1, pp. 74-93 (Year: 2013).

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

How to Asana Asana time tracking, youtube, excerpt, May 24, 2017 https://www.youtube.com/watch?v=z91qlex-TLc (Year: 2017) (1 page).

(56) References Cited

OTHER PUBLICATIONS

How to Asana, Asana project management, youtube, excerpt, Mar. 7, 2017 https://www.youtube.com/watch?v=qqANMTvVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv3o (Year: 2017) (24 pages).
How to Asana, Planning with Asana calendar, youtube excerpt, Feb. 14, 2017 https://www.youtube.com/watch?v=w8t6KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).
Justin Rosenstein, Unveiling the Future of Asana, Mar. 28, 2018 https://www.youtube.com/watch?v=nRI?d_WM4Bc (Year: 2018) (2 pages).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).
Macro, computer science, Wikipedia, archives org, 6 pages, Feb. 11, 2020 http://web.archive.org/web/20200211082902/https://en.wikipedia.org/wiki/Macro_(computer_science) (Year: 2020) 6 pages.
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).
Paul Minors, How to automate your tasks, youtube excerpts, Oct. 18, 2019 https://www.youtube.com/watch?v=IwF9XyUQrzw (Year: 2019).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
Wix.com, How to Use Wix Code with Marketing Tools to Create Custom Events, Oct. 18, 2018, YouTube, https://www.youtube.com/watch?v=MTBVykOYGvO&feature=emb_title, 2 pages.
www.asana.com (as retrieved from https://web.archive.Org/web/20160101054536/https://asana.com/press and https://web.archive.org/web/20160101054527/https://asana.com/product) (Year: 2016) 15 pages.
www.cogmotive.com/blog/author/alan Alan Byrne: "Creating a company Shared Calendar in Office 365"; pp. 1-17; Sep. 10, 2013 (16 pages).

| Task | Stage | Priority | Time Required | Due Date |
|---|---|---|---|---|
| Missing screen shot on product page | Phase 1 | High | 4 days | 09-02-2017 |
| Broken links on help page | Phase 2 | Medium | 8 days | 10-01-2017 |
| Product update blog post | | Low | | 09-30-2017 |
| Log in button not visible on mobile | Phase 1 | Low | 20 days | 12-15-2017 |

710

DATABASE MODEL WHICH PROVIDES MANAGEMENT OF CUSTOM FIELDS AND METHODS AND APPARATUS THERFORE

BACKGROUND

The use of databases to track activity is well known. For example, spreadsheets and other databases have been used for many years to keep track of the status of projects, and specific tasks within the project. More recently, specific software programs and services, referred to as project management or work tracking "tools" herein, have been provided which are focused on project management. Examples of such products and services are ASANA™, SMARTSHEET™, TRELLO™ and WRIKE™.

Each of these tools provides the ability for a user to customize behavior of the tool, to some extent, to fit the specific needs of a user. For example, users may have the need to track different types of data and the need to describe the different data in a way the user can understand. Typically, the tools define projects that have various specific tasks. The tasks are described by field values. Each field may have specific characteristics specified by it data type data type.

For example, one user might want to manage the status of orders and product inventory and another user might be managing the development cycle of a software application. As a result, each tool allows the user to create custom data field names (also referred to as "labels" and "descriptors") such as "Location", "Quantity", "Time", "Release Date" or any other descriptive label that the user may wish to use. This labeling is rudimentary and very similar to labeling columns in a spreadsheet.

However, project management tools are often used as collaborative tools by a large group of users, such as employees of an organization. The organization may have many projects to manage, each project having many tasks and users. Various users may participate in various projects within the organization. Further, each project may have different characteristics. Therefore, each project may have different data fields and related descriptors. For example, the chart below shows an extremely simple example of data fields for three different projects within an organization.

| Project A | Project B | Project C |
|---|---|---|
| DUE DATE | DUE DATE | DUE DATE |
| QUANTITY | LOCATION | VERSION |
| PRICE | VEHICLE TYPE | STATUS |
| DELIVERY | CUSTOMER | DEVELOPER |
| RESPONSIBLE PARTY | | RESPONSIBLE PARTY |

In the example above, the data field DUE DATE is used by all three projects, and the data field RESPONSIBLE PARTY is used by Project A and C, but not Project B. Also, each project has data fields that are unique from other projects. Further, as noted above, each project can have various users. The number of data fields required for a specific project can be very high and the resulting number of custom data fields across an organization can be even larger, sometimes in the thousands.

Of course, it is desirable to manage the use of custom data fields. For example, if one user creates accustom field for one project, it is desirable to allow other users to use that field in other projects. Conversely, if a field with the label and specific characteristics is created, it can be problematic if a different field is created with the same label and used in a different context. For example, some tool permit users to share custom fields across projects, but they don't have to be unique. Thus, two fields having very different characteristics can both be named "Priority". For example, one field can be a dropdown list having selections "1", "2", or "3" indicating levels of priority and another field can be a checkbox indicating whether or not the task associated with the field is a priority. Other tools allow users to create custom data fields whereby users can have multiple data fields having the same name that have similar or different characteristics. When a user creates a data field, it is distinct from other data fields that may have the same name. On the other hand, a user can edit a data field created by another user. For example, a user may wish to delete a drop option in a data field or otherwise modify the data field. These models for customizing data fields can lead to confusion, inaccuracy, and inefficiency in project management.

BRIEF DESCRIPTION OF THE DRAWING

The invention will be described through embodiments and the attached drawing in which.

DETAILED DESCRIPTION

Figures 1, 2:
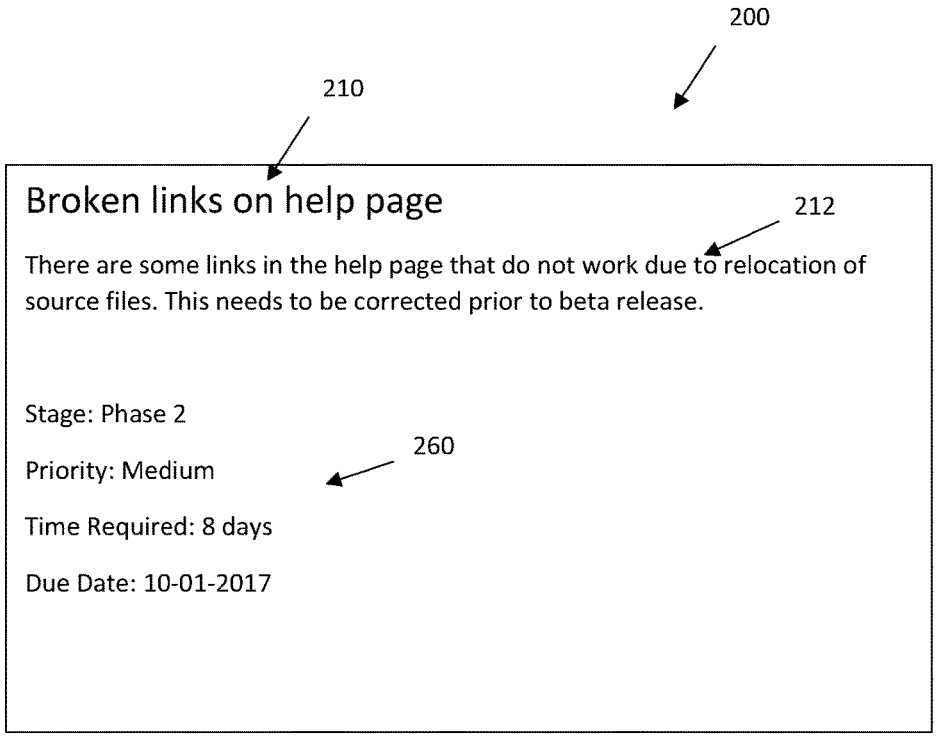
FIG. 1 is an example of a user interface displaying a task list.
FIG. 2 is an example of a user interface displaying a task detail.

While devices, methods, apparatuses, and computer-readable media are described herein by way of examples and embodiments, those skilled in the art recognize that devices, methods, apparatuses, and computer-readable media are not limited to the embodiments or drawings described. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

The applicant has developed a data model for managing custom fields in a project management tool whereby custom fields can be defined and shared across an organization, and are always unique. If one employee creates a field for 'Priority', anyone else in the organization can use that field on their projects. There can't be more than one 'Priority' field within the organization and the attributes of the field will be preserved across projects. Custom fields can be displayed or hidden at the project list level. The data model allows users to choose to show or hide each field on a project. Further, the data model allows advanced search functions for custom fields and allows for reporting across projects. For example, a user can search across multiple projects for all tasks where the field 'Priority' is set to 'High'. As another example, for numeric fields, a report can be generated across projects for specific ranges of numbers. The embodiment can also perform basic aggregations of number fields on tasks. If a user multi-selects 5 tasks, then the number field is summed or charts or other aggregations of the data care created. This works across projects and search reports.

Other field level unique features can be enabled such as unique colors for custom field drop-downs. For example, for the custom field 'Priority', a value of 'High' can be colored red, a value of 'Medium' can be colored yellow and a value of 'Low' can be colored green. Such unique features can persist across projects and various views, such as list views and calendar views. Custom fields can be aggregated with multiple projects. For example, if a task is in three projects, and each has custom fields, then the task has all those custom fields with consistent ordering. Because custom fields are shared across an organization and are unique, if a custom field is in multiple of these projects then it only appears once in the task. Also, the data model makes custom fields resistant to "field trampling"—if a user changes another user's custom field, or a task is removed from projects, then the custom field data still exists on the task in a read-only manner. A user can simply reverse these actions to make the field data editable once more. In the novel data model, custom fields can be first-class fields in the API to allow other parties to build integrations that leverage the custom fields.

The disclosed embodiment is achieved through a novel data model in which an independent object is used to represent each custom field (sometimes referred to as a custom "property" herein). The embodiment associates fields with tasks that are part of a project. For each custom field associated with a task, a unique object is created that associates the task with a value for that custom field. This is referred to as a "join object" approach. To aid understanding of the technical advantages resulting from the data model, a very brief description of the user experience is presented immediately below, followed by a more detailed description of the data model.

Custom fields allow users of a project management tool to track work across whatever information is most useful for them. If field names, descriptions, and values are customizable by a user, the user can create a field for anything of interest to the users of a project. The embodiment permits users to create custom fields for just about any data that they want to track in a structured way. The custom fields are then unique and available across a group of users, tasks and projects.

For example, FIG. 1 is a user interface, such as an interactive display on the screen of a computing device, illustrating custom fields for tasks in a project. User interface 100 includes 5 columns, Task Column 110, Stage Column 120, Priority Column 130, Time Required Column 140 and Due Date Column 150. In this example, Task column 110 and Due Date column 150 each define "out of the box" fields that are hardcoded into the software tool. However, Stage Column 120, Priority Column 130, and Time Required Column 140 define custom fields that were created by a user of the software tool. For each task, fields are defined for associated custom fields. For example, the task "Missing screen shot on product page" has a custom field of "Stage" having a value of "Phase 1". Note that not all tasks in a project will necessarily be associated with any specific custom filed of that project. For example, in FIG. 1, the task "Product update blog post" is not associated with the custom field "Stage" or the custom field "Time Required". As shown in FIG. 1, these fields can have null values for such unassociated tasks.

Custom fields added to a project can appear in a list view of that project, as shown in FIG. 1, or in the task details of any task. The data model allows fields to be managed at the project level and shown on all tasks in that project. A field created for one project is available to all other projects within the organization. FIG. 2 is a user interface displaying the details of the task "Broken links in help page" of FIG. 1. As an example, the interface of FIG. 2 can be produced by selecting the task form the list of FIG. 1. User interface 200 displays the task at 210, a description of the task at 212 and the values of all custom fields associated with the task at 260.

Turning to the data model, Custom Fields of the embodiment can be divided into two kinds: primitives (like strings, integers, etc. . . . ) and references (other objects in the system). All primitive and reference values are modeled as unique independent objects that associate the task with the value. Additionally, the cardinality of properties may be either scalar (single value) or list (multiple values). For example:

A "tracking number" field would use a primitive scalar property (single string value)
A "categories" field would use a primitive list property (multiple enum values)
An "owner" field would use a reference scalar property (single user value)
A "dependencies" field would use a reference list property (multiple task values)

As noted above, tasks in a project can hold user-specified custom fields which provide extra information; for example, a priority value or a number representing the time required to complete a task. This lets a user define the type of information that each task within a project can contain. A custom field is defined by metadata. This metadata is shared across an entire organization or workspace. Projects can have custom fields associated with them individually. This is conceptually akin to adding columns in a database or a spreadsheet: every task (row) in the project (table) can contain information for that field, including "blank" values, i.e. null data. Tasks have custom field values assigned to them.

The invention includes a novel schema. Objects, metadata, and classes are the basic components that are used to build object definitions in the schema. Objects are structures that define the property at the highest level. Attributes, sometimes referred to as "metadata" herein define the information that is stored in an object or in another attribute. As an example, an organization has defined a custom field for "Priority". This field is of enum type (described below and sometimes referred to as "option" type) and can have user-defined values of Low, Medium, or High. This is the custom field metadata, and it is visible within, and shared across, the entire organization. A project can then be created in the organization, called "Bugs", and the "Priority" custom field can be associated with that project. This will allow all tasks within the "Bugs" project to have an associated "Priority". When a new task is created within "Bugs", the new task will have a field named "Priority" which can take on the custom field value of one of, Low, Medium, or High.

An object definition is an association of attributes that describe the characteristics of an object that stores specific pieces of data. The kind of data that the object stores determines which attributes are needed to define the object. Defining objects and attributes this way gives the schema the ability to efficiently define many different types of objects. Object definitions are categorized into groups that are called classes. Classes act as blueprints that can be used each time a new object is created. When a new object is created, the object's class determines the attributes that are associated with the new object, including which attributes are required and which attributes are optional.

The objects of the data model are constructed in accordance with the following schema. In the embodiment, the suffix "Proto" is used to denote prototypes (definitions) of custom fields, and the suffix "Value" is used for actual instances of the values. The primary objects of the data model are described briefly immediately below.

"Proto": Stores the metadata about a custom filed. Each different type of custom field has its own subclass of the generic Proto. For example, CustomPropertyNumberProto' is subclassed from 'CustomPropertyAbstractProto', and adds properties that are specific to representing the numeric type in a custom field.

"Value": An instance of a value of a custom field as it appears on a task (or eventually, other objects in the system that can have custom field values). This is represented as the join between a Proto and the object the custom field is set on. Part of the data in this join is the actual value the custom field takes on. Like Protos, Values are also subclassed based on the type of custom property.

"ProjectSetting": The join between a Proto and a Project that bestows that Proto upon all of its tasks. There may also be settings specific to the Project, such as whether the custom field should appear in the task list by default, and metadata to determine the ordering of the field in the Project.

"TaskChangedStory": Stores the metadata about a Value changing on a task. Each different type of custom property has its own subclass of the generic TaskChangedStory. For example, 'TaskCustomPropertyNumberChangedStory' is subclassed from 'TaskCustomPropertyAbstractChangedStory' and contains properties for the old/new data specific to the numeric type. Each subtype should contain two properties: old_dataname, new_dataname, where dataname is the custom field name for data in the Value object.

"ProtoSubmission": Stores information on create and edit submissions for custom field protos. Keeps track of the submission status (pending, success, or failure) to keep the edit/create field dialog open on the client until changes propagate. The successful ProtoSubmissions associated with a given proto represents the change history for that proto. All custom field types use the same ProtoSubmission class.

Each Custom Field object of the embodiment has the following fields:

| Field | Description |
| --- | --- |
| id | 1234. Globally unique ID of the custom field. |
| created_at | '2012-02-22T02:06:58.147Z'. The time at which this custom field was created. |
| name | 'Priority'. The name of the custom field. |
| type | 'text' 'enum' 'number'. The type of the custom field. Must be one of the given values. |

-continued

| Field | Description |
| --- | --- |
| enum_options | [{id: 789, name: 'Low', enabled: 'true', color: 'blue'}, . . .]. Only relevant for custom fields of type 'Enum'. This is described in more detail below. |
| precision | Only relevant for custom fields of type 'Number'. This field dictates the number of places after the decimal to round to, i.e. 0 is integer values, 1 rounds to the nearest tenth, and so on. |

Figure 3:
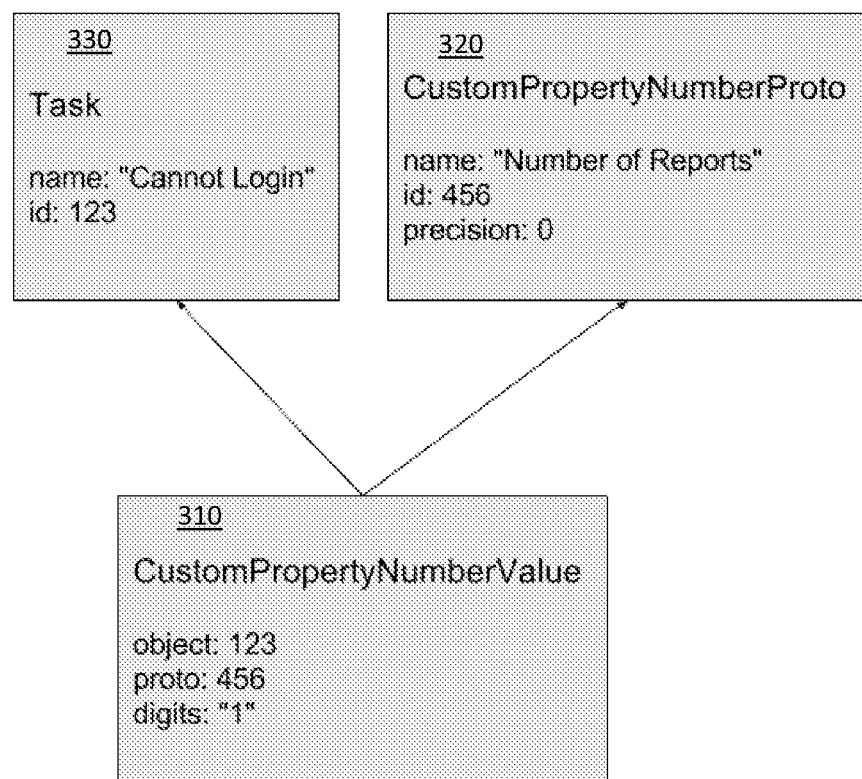
FIG. 3 is a block diagram of a task object, a custom property proto object and a custom property number value object.

For each custom field associated with a task, an object is created that associates the task with a value for that custom field. There is a new type of object for each type of property, e.g., CustomPropertyTextValue, CustomPropertyEnumValue, CustomPropertyReferenceValue, "CustomPropertyNumberValue" etc. . . . "Object" refers to the object the property is set on, "property" refers to the CustomPropertyAbstractProto the value is set for and "value' refers to the actual value of the property. As an alternative to the model described herein in detail, for each property set on a Task, there can be a row in the database just like a normal property (object_id, property_id, value, etc.). For scalars these would automatically be sent from server to client for any projection on an object. Given a projection, a primitive property by ID is set. As another alternative, Join Objects can be used for reference properties, and Property Rows for primitive properties. As yet another alternative, Join objects can be used for reference properties, and a JSON Blob for primitive properties. As illustrated in FIG. 3, a custom property value object 310 assigns a value for a particular proto 320 to a task. In this example, the CustomPropertyNumberValue object assigns the value "1" for "Number of Reports" to the task 330 "Cannot Login."

Figure 4:
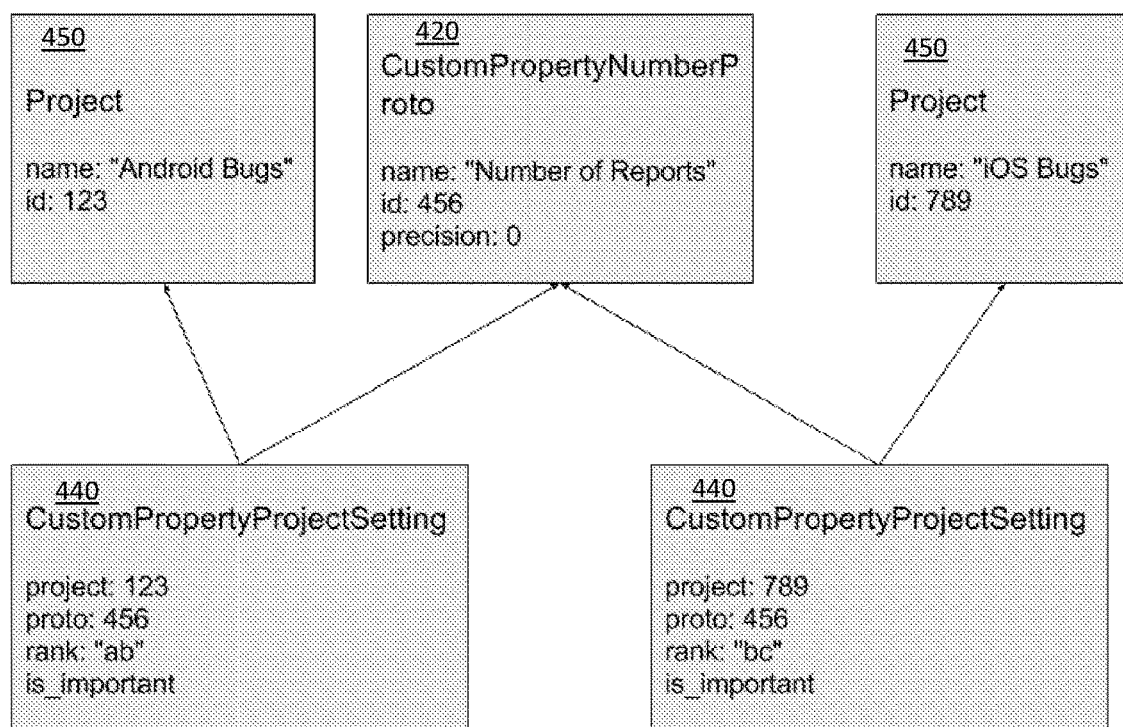
FIG. 4 is a block diagram of project objects, a custom property proto object and custom property project settings objects.

As illustrated in FIG. 4, a single custom field ("proto") can be associated with multiple projects. CustomPropertySetting objects 440 associate a proto to a project. In this example, the CustomPropertyNumberProto "Number of Reports" object 420 is associated with both the Project "Android Bugs" object 450 and the Project "iOS Bugs" object 450 through respective CustomPropertySetting objects 440.

Figure 5:
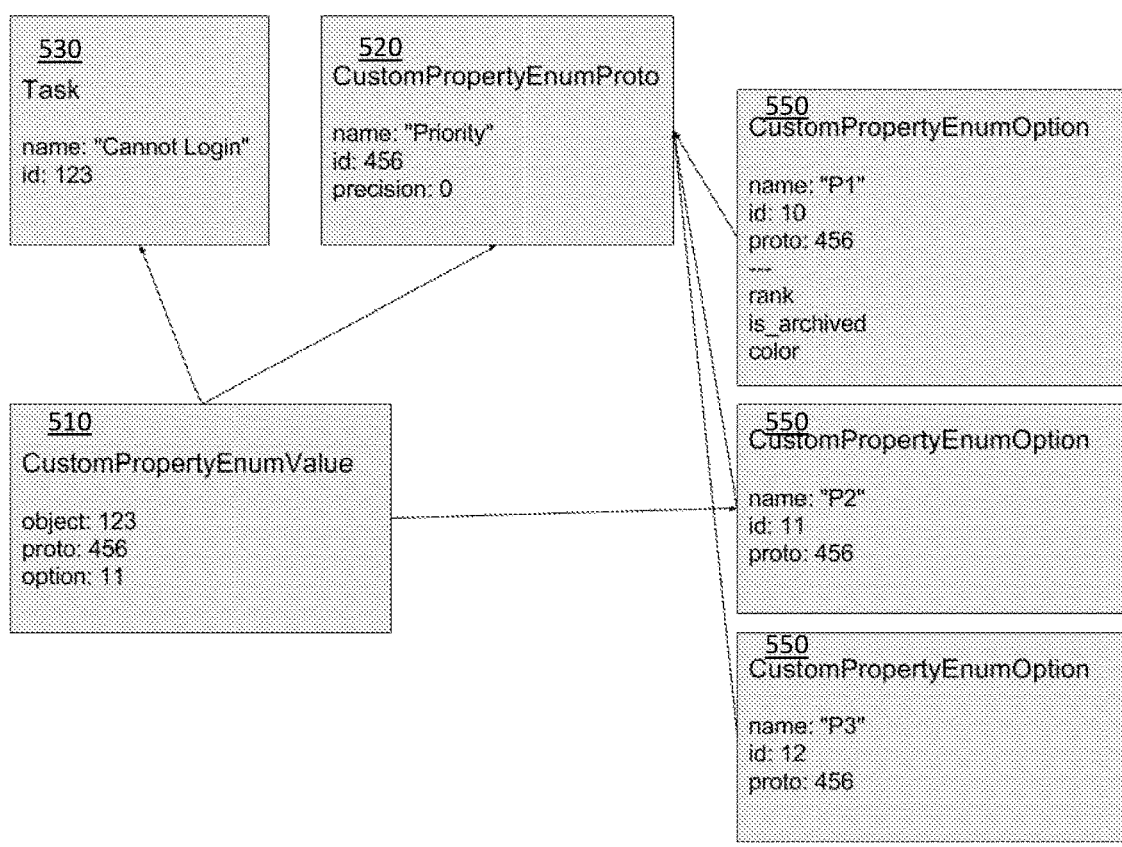
FIG. 5 is a block diagram of a task object, a custom property proto object and a custom property options objects.

Since custom fields can be defined for many types, and these types have different data and behaviors, there can be fields that are relevant to a particular type but not relevant to other types. For instance, the enum_options object noted above is only relevant for the enum type and defines the set of choices that the enum object could represent. As illustrated in FIG. 5, EnumProto object 520 has multiple options, represented as EnumOption objects 550, in this example EnumOption objects named P1, P2, and P3. These objects have a name and proto reference, along with other metadata (rank for ordering, color for display . . . ). EnumValue object 510, object 123 in this example, associates a particular option to task object 530. In this example option 11 of P2 is associated with the task "Cannot Login". This model allows for dynamic renaming options.

In the embodiment, custom fields are of one of three types; text, number, and enum. Number fields can have an arbitrary precision associated therewith. For example, a precision of 2 would round its value to the second (hundredths) place, i.e., 1.2345 would round to 1.23. On tasks, the custom field value will have a number_value property to represent this field. Enum fields represent a selection from a list of options. On the metadata, they will contain all the options in an array. Each option has 4 properties:

id—the id of this enum option. Note that this is the id of the option—the Custom Field itself has a separate id.

name—the name of the option, e.g. "Choice #1"

enabled—whether this field is enabled. Disabled fields are not available to choose from when disabled, and are visually hidden in the Asana application, but they remain in the metadata for Custom Field values which were set to the option before the option was disabled.

color—a color associated with this choice.

On the task's custom field value, the enum will have an enum_value property which will be the same as one of the choices from the list defined in the custom field metadata.

Custom fields can be accessible via an API through several endpoints at the top level (e.g. /custom_fields and /custom_field_settings) and through calls on workspaces, projects, and tasks resources. The API also provides a way to fetch both the metadata and data which define each custom field, so that a client application may render the proper UI, such as those shown in FIGS. 1 and 2, to display or edit the values. Example API calls are set forth below.

Get the metadata for a custom field of type 'text'

```
# Request
curl -H "Authorization: Bearer <personal_access_token>" \
    https://app.asana.com/api/1.0/custom_fields/124578
# Response
HTTP/1.1 200
{
  "data": [
    {
      "id": 134679,
      "created_at": "2016-07-11T14:29:23.249Z",
      "name": "Owner",
      "type": "text"
    }
  ]
}
```

Get the metadata for a custom field of type 'number'

```
# Request
curl -H "Authorization: Bearer <personal_access_token>" \
    https://app.asana.com/api/1.0/custom_fields/124578
# Response
HTTP/1.1 200
{
  "data": [
    {
      "id": 938271,
      "created_at": "2016-07-11T14:29:23.249Z",
      "name": "Price",
      "type": "number",
      "precision": 2
    }
  ]
}
```

Get the metadata for a custom field when that field is of type 'enum'.

```
# Request
curl -H "Authorization: Bearer <personal_access_token>" \
    https://app.asana.com/api/1.0/custom_fields/124578
# Response
HTTP/1.1 200
{
  "data": [
    {
      "id": 124578,
      "created_at": "2016-07-11T14:29:23.249Z",
      "name": "Priority",
      "type": "enum",
```

```
        "enum_options": [
          {
            "id": 789,
            "name": "Low",
            "enabled": true,
            "color": "blue"
          },
          {
            "id": 208,
            "name": "Medium",
            "enabled": false,
            "color": "yellow"
          },
          {
            "id": 439,
            "name": "High",
            "enabled": true,
            "color": "red"
          }
        ]
    }
  ]
}
```

Return a List of All Custom Fields in a Workspace

As custom fields are shared across a workspace or organization, the workspace can be queried for its list of defined custom fields. Like other collection queries, the fields can be returned as a compact record. The compact record for custom fields can include type as well as id and name.

```
# Request
curl -H "Authorization: Bearer <personal_access_token>" \
    https://app.asana.com/api/1.0/workspaces/14916/custom_fields
# Response
HTTP/1.1 200
{
  "data": [
    {
      "id": 124578,
      "name": "Priority",
      "type": "enum"
    },
    {
      "id": 134679,
      "name": "Owner",
      "type": "text"
    },
    "~..."
  ]
}
```

The returned information can describe the custom field metadata—the field's name, its type, and any additional information about the custom field as is appropriate.

As noted above, custom fields are associated with one or more projects. A mapping between a custom field and a Project is handled with a CustomPropertyProject Setting object as discussed above with respect to FIG. 4. This object can contain a reference for each of the custom field and the Project, as well as additional information about the per-Project status of that particular custom field. For example, the metadata is_important can specify if the custom field will appear in the task list of FIG. 1. A Project can also be modified to add a custom field with endpoints. For example, /projects/addCustomFieldSettings and projects/removeCustomFieldSettings can be used to associate and dissociate the custom field and Project. The top-level id of each entry in the custom_fields array is the id of the custom field metadata, as it is the compact representation of this metadata. This can be used to refer to the full metadata by making a request to the /custom_fields/{custom_fields id} endpoint as described above.

The data model allows the validation of custom filed names across projects when creating or editing custom fields. A custom field name should not be identical to other custom fields in the organization or any reserved names. For example, assume that a user creating a new custom filed want to name the field "Priority." As the user enters the letters "p", "r", "i" . . . , the user interface will display all custom filed names having that sequence of letters and allow the user to select one of those existing custom fields or edit the names to create a new custom field. Semantic analysis and AI can be used to flag or prevent semantically similar custom fields.

The novel data model described herein, which allows custom fields to be shared across projects results in better operation of a computing system executing project management operations. However, the model also raises some technical issues that need to be dealt with. Resolutions to those issues are described below.

Figure 7:
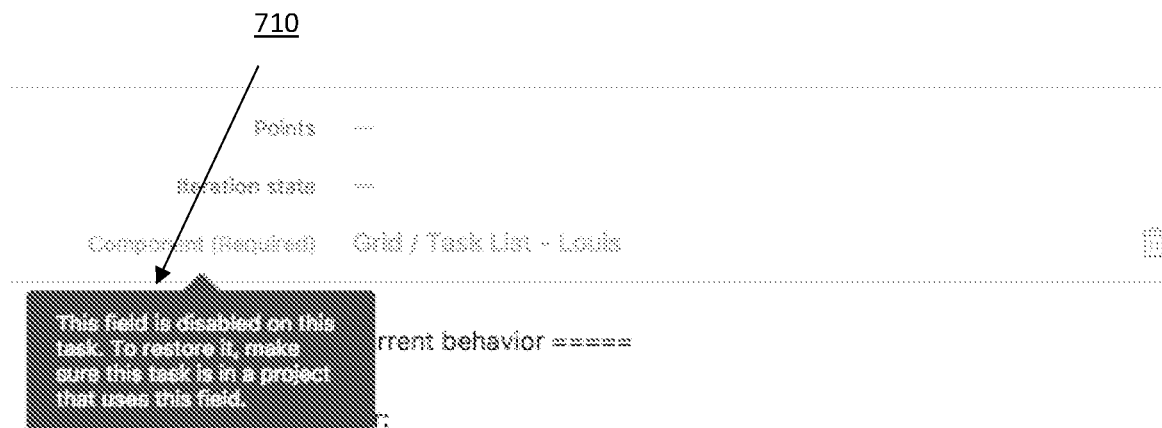
FIG. 7 is a user interface displaying a disabled filed indicator.

As shown in FIG. 7, when information that is contained in a custom field value loses a logical association with its metadata definition, the value becomes disabled. For example, if the custom field metadata is removed from a Project, or a Task with a custom field is moved to a different Project which does not have the custom field metadata associated with it, a logical association can be lost. In the embodiment, the value remains on the Task, and the custom field metadata can still be found and examined. Moving the Task back under a Project with that Custom Field applied to it or applying the custom field metadata to the current Project will return the Custom Field value to an enabled state. In this scenario, the Custom Field will be re-enabled and editable again. Tasks that are associated with multiple Projects do not become disabled, so long as at least one of the Projects is still associated with the custom field metadata. In other words, Tasks with multiple Projects will retain logically associated to the set of custom field metadata represented by all of their Projects. The API can enforce the same operations on disabled custom field values as on enabled values.

Access to custom fields can be controlled based on user or group permissions. When read access is allowed, Custom field information is returned as described above. When read access is not allowed, no custom_fields property will be returned on Tasks, no custom_field_settings property will be returned on Projects, and requests to the /custom_field_settings and /custom_fields will return an error such as HTTP code 403 (forbidden). When write access is not allowed, all requests that would modify Custom Fields (for example POST to /project/addCustomFieldSettings or writes to the custom_fields property on Tasks) will return and error such as HTTP code 403 (forbidden).

Figure 6:
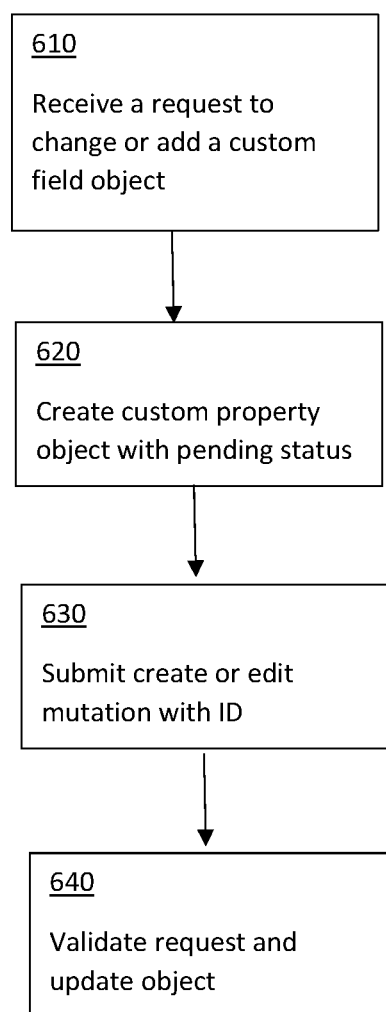
FIG. 6 is a flowchart of a method for changing or adding custom filed objects.

FIG. 6 illustrates a method for managing changes to the data model. At step 610, a request to add or change a custom field is received from a user. At step 620, a CustomPropertyProtoSubmission object is created with the default status of "pending" status and the domain id of the user. At step 630, a CustomPropertyProtoMutations.createOrEdit mutation command is submitted with the id of the newly created submission status object created in step 620. At step 640, the request is validated on the server and the associated submission status is updated to either "error" or "success". If the status is updated to success the custom field object is created and/or updated. Calling the mutation first in step 630 ensures that all requested changes will have finished propagating before the loading indicator is closed. This also allows the validation logic to be executed on the server, instead of performing the checks on the client which likely will not have all Project information. Querying for the success objects on a given proto allows tracking of the revision history for custom fields.

The validation logic can be configured as is appropriate for the application. As an example, the system can check if the name for this field match other fields, if the name for this field matches any first-class fields, or any special terms that are forbidden, (such as "Name", "Description", etc). Matching can include syntactical processing such as ignoring white-space.

The data model also creates the possibility of "orphaned values" that should be addressed. For example, assume that there are two custom fields, "Priority" and "Points", on a project "A", and three tasks in that project. If those three tasks have data in them for the two custom fields and if a user removes a task from the project, then it no longer inherits those custom fields. But it is desirable to not lose the data already on those tasks. This problem can occur, for example, when a task is moved to another project, when a task is moved to be a subtask of another task, when a custom filed is removed from project that conferred, or when a project that conferred a custom task is deleted. The embodiment "orphans" the values. In other words, the values are maintained in the data model for the tasks, and the UI is signaled that these fields are no longer inherited by the project. A bubble, or other indicator 710, can be displayed to the user as shown in FIG. 7.

Figure 8:
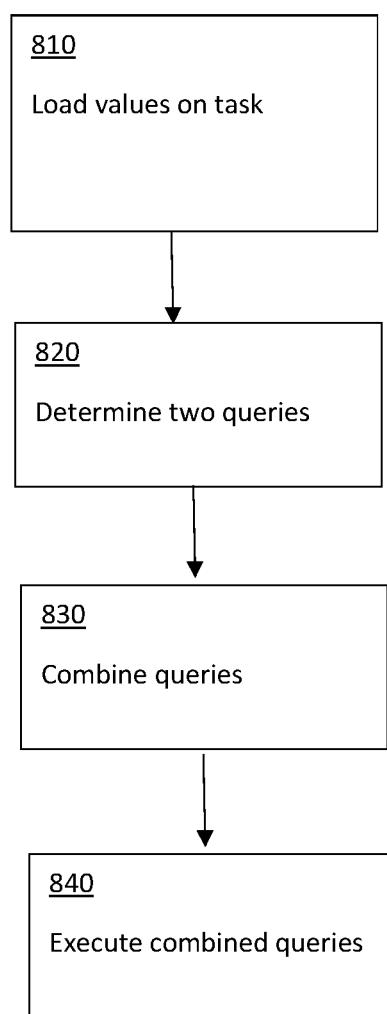
FIG. 8 is a flowchart of a method for identifying orphaned values.

FIG. 8 illustrates a method for determining orphaned values. In step 810, the values the task at issue are loaded. In step 820, two queries are determined. The first query is to find custom field values on the task and the second query is to find custom field Protos on the projects that task. In step 830, the two queries are combined, to associate "values which are bestowed by projects in the task" and "values which are orphaned on the task".

Given a list of tasks, a user may want to know the custom properties protos available to those tasks. To derive the properties available to a task, the system will need to determine (1) All of the protos bestowed on this task by its projects, ordered by the ProjectSetting's rank and (2) All of the values set on a task, since these can be orphaned. Therefore, a consistent ordering algorithm is desirable to order the display of protos in the UI. With such an algorithm, custom fields will be displayed in a consistent order regardless of the various queries used to produce a task list or other display of task information.

Figure 9:
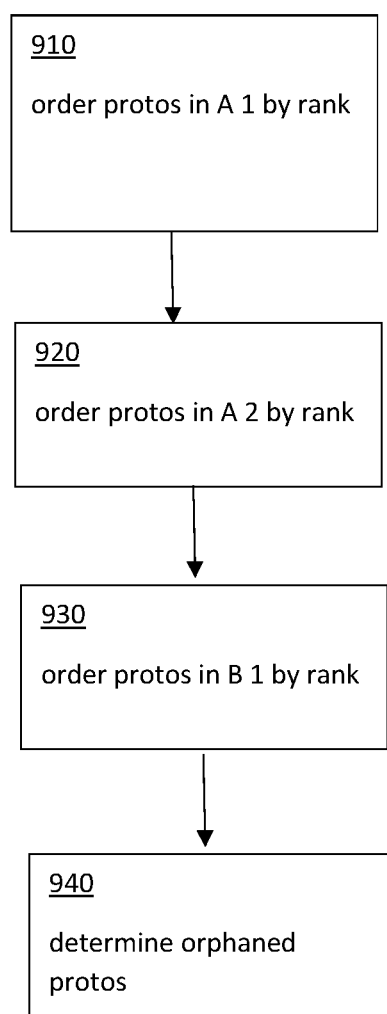
FIG. 9 is a flowchart of a method for ordering tasks in a task display.

FIG. 9 illustrates an ordering algorithm. In this example, there are two tasks, A and B, contained in to projects, 1 and 2. Note that each task custom field can be ordered within a project based on metadata as described above. At step 910 protos in task A, project 1 are ordered by rank. At step 920, protos in task A, project 2 are ordered by rank. At step 930, protos in task B, project 1 are ordered by rank. At step 940, protos in task B, project 2 are ordered by rank. At step 960, orphaned protos in task A are determined and orphaned protos in task B are determined. In other words, values that are set on a task but having protos the are no longer inherited by projects are determined.

Another problem that arises when managing tasks across projects is the situation when there are multiple existing tasks with a dropdown field and a user edits the dropdown field to remove one of the dropdown field values. For example, assume there are two existing tasks having the custom field "Primary Sales Team" which is a dropdown field having the possible selected values of "New Business", "SE", "Manager", and "Sales Ops". If one of the tasks has the value of "New Business" associated with the filed "Customer Type" and a user modifies the custom field "Customer Type" to remove the "New Business" value selection, this should be handled in a way that does not lose data but which indicates the newly changed drop down selections.

Figure 10:
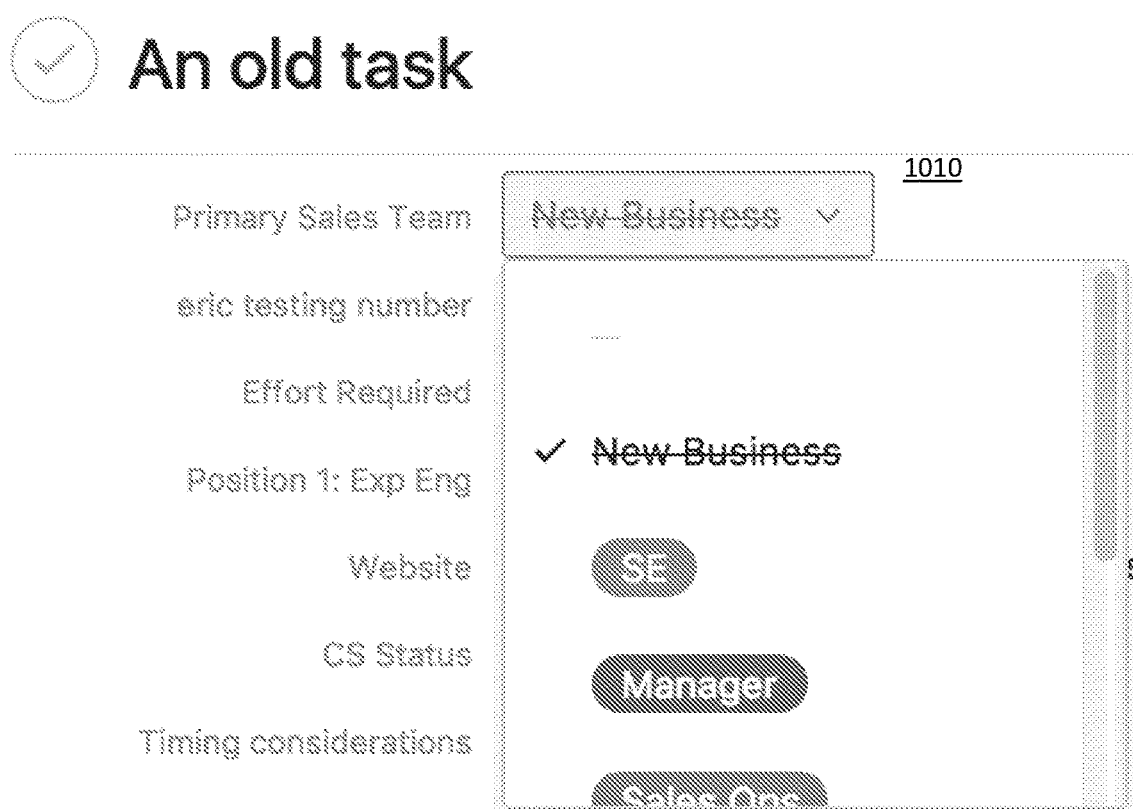
FIG. 10 is a user interface displaying a deleted dropdown menu value.

In the embodiment, the removed field value is archived to preserve the data associated with the task. Specifically, if a dropdown option is archived, the attribute is_archived is set to "true" on the corresponding CustomPropertyEnumOption object. This allows the value to be reserved but handled differently. For example, when showing dropdown options on the UI, all unarchived options on that dropdown can be displayed. If the value currently set on the task is an archived option, it can be displayed differently in the UI. For example, FIG. 10 shows a UI displaying the task "An old task" having the archived value of "New Business" which is indicated with a strike through at 1010. When editing dropdown options, a user can "revive" an archived option by adding a new option with the same name. This automatically makes it so all tasks that previously had this option as a value still have that same option as a value.

As noted above, dropdown options are attached to objects in the data model. This yields some very significant user technical advantages. Modifying options causes data on tasks to be continually updated. If a user sets multiple tasks to use option "Red" on dropdown "Color", and updates the dropdown, then all of those tasks will update accordingly. For example, if a user renames option "Red" to "Rojo", then the tasks set to "Red" will change to "Rojo". If a user adds an option color to the option, then all associated tasks will reflect that new color. Reordering options does not "trample" data on existing tasks. For example, there is a dropdown with "Red", "Green", "Blue" and a user reorders the options to "Green", "Red", "Blue", existing data on tasks will not change.

"Stories" are a record of changes to the task. Stories can be displayed with a task to show a user how the task has evolved over time and who has interacted with the task. For example, a story can show that Bob created the task, assigned it to Charlie and set the due date as July 15, all on July 1, Alice changed the due date of the task to July 30 on July 7, and Charlie marked the task as complete on July 30.

Suppose a user, Sue, sets a value "hello" for a custom field "Text Field" on a task. And then a second user, Bob, changes that value to "goodbye" on the same task. In this case, the embodiment can show two "shuffle stories" on the task:

1. Sue set Test Field to "hello".Jan 9
2. Bob changed Test Field from "hello" to "goodbye".3: 25 pm However, if Sue sets the value "hello" and then immediately realizes she was mistaken and changes it to "goodbye", the embodiment will consolidate these two stories together. When a user sets a custom field, the embodiment does the following. It looks backwards in time from most recent story on a task. If a story by a different user is found first, a new story is created. If a story of the same custom field by the same user is found first, and it was created within the last 24 hours (or any other appropriate time period), the story is updated. Otherwise a new story is created.

As noted above, because fields are preserved across projects, users can search for tasks by custom fields across multiple projects. For example, a user could search for "Tasks assigned to me, where Priority is P1" to find all of their high priority tasks. In the embodiment, this is implemented by adding custom field data, including the field ID and value, to ElasticSearch indexes, or any other type of search index. Elasticsearch is an open source search engine based on Lucene. The embodiment transforms a user-readable query (like "Priority is P1") to an ElasticSearch query containing the proto ID and option ID(like "{proto_id: 12345, value: 789}"). For exampleThis works across field types, e.g. a user can search by number fields with "Tasks followed by me, where Cost is greater than 1000". A user can also use custom fields to filter searches and sort project lists by sorting by custom fields under the "view" menu in the list view (see FIG. 1) of any project.

Figure 11:
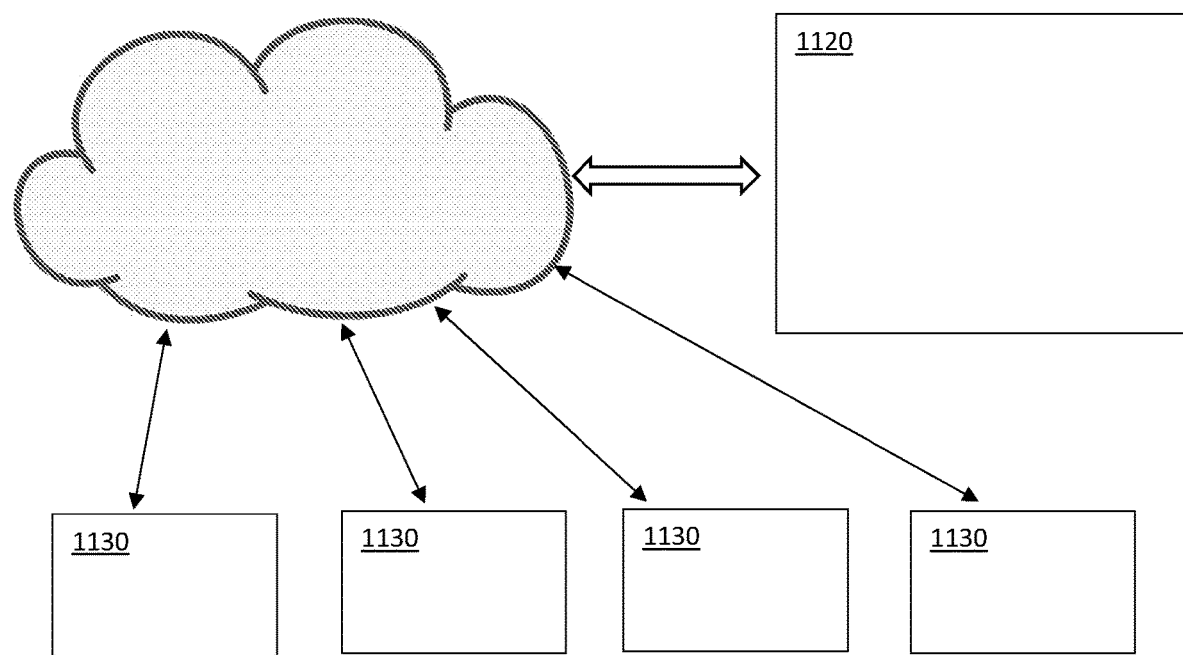
FIG. 11 is a computer architecture of a project management system.

FIG. 11 illustrates an example of a computer architecture that can be used to accomplish the functions disclosed above. The architecture includes server 1120 which can be a web server running Apache or any other server application and which can include one or more computing devices. Client devices 1130, which can include a web client running a browser and which can include one or more computing devices, communicate with server 1130 over a network, such as the Internet. Each device can be a personal computer, a mobile phone or any other computing device(s). Each device can have a processor for executing computer readable instructions and memory for storing computer readable instructions in a non-transient manner. Client devices 130 can execute a viewer application, such as a web browser, or a native application to exchange data with server 1120. The various functions noted above can be accomplished on server 1120 or client devices 1130 as appropriate for the specific application. The embodiment take the form of computer executable instructions recorded on non-transient media. Client devices 1130 can be associated with one or more users.

Having described and illustrated the principles of our invention with reference to the described embodiments, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A system configured to manage custom data fields of task objects, the system comprising:
   one or more physical processors configured by computer-readable instructions to:
      define a task object for a task managed by a project management environment, the task object including a unique task ID for the task;
      define a Proto class object specifying metadata for a custom field, the metadata specifying a definition of the custom field, the Proto class object having a unique proto ID;
      define a Value class object by performing a join between the Proto class object and the task object, wherein the join defines the Value class object such that the Value class object includes i) a value of the custom field for the task in accordance with the definition of the custom field as applied to the task object, ii) the unique task ID so that the value of the custom field specified in the Value class object is associated with the task, and iii) the unique proto ID so that the value of the custom field specified in the Value class object is associated with the definition of the custom field specified by the metadata of the Proto class object; and effectuate presentation of the value for the custom field for the task in a user interface of the project management environment by accessing the Value class object based on the unique task ID and the unique proto ID being associated with the task and the custom field, respectively, and retrieving the value.

2. The system of claim 1, wherein the one or more physical processors are further configured by the computer-readable instructions to:

define a project object representing a project; and define a project setting object including project metadata specifying specific settings, the project setting object representing a join between the project object and the Proto class object.

3. The system of claim 2, wherein the Proto class object is a custom field option proto specifying that a given custom field has selectable value options.

4. The system of claim 1, wherein the Value class object is expressed in a form of a JavaScript Object Notation (JSON) blob.

5. The system of claim 1, wherein the Value class object is expressed in a form of a join object.

6. The system of claim 1, wherein the metadata indicates one or more of a tracking number, a category, an owner, or dependencies.

7. The system of claim 1, wherein the task object has a property that contains values of a set of custom fields associated with the task.

8. The system of claim 1, wherein in an event that the task no longer inherits a given custom field because of editing, one or more values for the given custom field in the task are maintained in association with the task.

9. The system of claim 1, wherein the one or more physical processors are further configured by the computer-readable instructions to receive edits to remove a specific selectable value option from a custom field option proto, and set an archive attribute to preserve the specific selectable value option.

10. The system of claim 9, wherein the specific selectable value option is displayed differently in the user interface to indicate that is has been removed.

11. A method to manage custom data fields of tasks, the method comprising:

defining a task object for a task managed by a project management environment, the task object including a unique task ID for the task;

defining a Proto class object specifying metadata for a custom field, the metadata specifying a definition of the custom field, the Proto class object having a unique proto ID;

defining a Value class object by performing a join between the Proto class object and the task object, wherein the join defines the Value class object such that the Value class object includes i) a value of the custom field for the task in accordance with the definition of the custom field as applied to the task object, ii) the unique task ID so that the value of the custom field specified in the Value class object is associated with the task, and L the unique proto ID so that the value of the custom field specified in the Value class object is associated with the definition of the custom field specified by the metadata of the Proto class object; and effectuating presentation of the value for the custom field for the task in a user interface of the project management environment by accessing the Value class object based on the unique task ID and the unique proto ID being associated with the task and the custom field, respectively, and retrieving the value.

12. The method of claim 11, further comprising:

defining a project object representing a project; and defining a project setting object including project metadata specifying specific settings, the project setting object representing a join between the project object and the Proto class object.

13. The method of claim 12, wherein the Proto class object is a custom field option proto specifying that a given custom field has selectable value options.

14. The method of claim 11, wherein the Value class object is expressed in a form of a JavaScript Object Notation (JSON) blob.

15. The method of claim 11, wherein the Value class object is expressed in a form of a join object.

16. The method of claim 11, wherein the metadata indicates one or more of a tracking number, a category, an owner, or dependencies.

17. The method of claim 11, wherein the task object has a property that contains values of a set of custom fields associated with the task.

18. The method of claim 11, wherein in an event that the task no longer inherits a given custom field because of editing, one or more values for the given custom field in the task are maintained in association with the task.

19. The method of claim 11, further comprising receiving edits to remove a specific selectable value option from a custom field option proto, and setting an archive attribute to preserve the specific selectable value option.

20. The method of claim 19, wherein the specific selectable value option is displayed differently in the user interface to indicate that is has been removed.

* * * * *

UNITED STATES PATENT AND TRADEMARK OFFICE
CERTIFICATE OF CORRECTION

PATENT NO. : 11,775,745 B2
APPLICATION NO. : 18/159527
DATED : October 3, 2023
INVENTOR(S) : Eric Seth Pelz et al.

Page 1 of 1

It is certified that error appears in the above-identified patent and that said Letters Patent is hereby corrected as shown below:

In the Claims

In Claim 11, Column 14, Line 12, please replace "and L the" with --and iii) the--, therefor.

Signed and Sealed this
Fourteenth Day of November, 2023

Katherine Kelly Vidal
*Director of the United States Patent and Trademark Office*